United States Patent [19]

Tanemura

[11] 4,389,492

[45] Jun. 21, 1983

[54] SPINEL-MAGNESIA BASIC BRICK

[75] Inventor: Fumikazu Tanemura, Aichi, Japan

[73] Assignee: Mino Yogyo Co., Ltd., Gifu, Japan

[21] Appl. No.: 308,672

[22] Filed: Oct. 5, 1981

[30] Foreign Application Priority Data

Oct. 7, 1980 [JP] Japan .................. 55/140290

[51] Int. Cl.$^3$ .............................................. C04B 35/04
[52] U.S. Cl. ...................................... 501/112; 501/120
[58] Field of Search ............................. 501/112, 120

[56] References Cited

U.S. PATENT DOCUMENTS

| | | | |
|---|---|---|---|
| 2,846,326 | 8/1958 | Pearson et al. | 501/112 |
| 3,184,322 | 5/1965 | Parikh et al. | 501/120 |
| 3,959,001 | 5/1976 | Clasen et al. | 501/112 |
| 4,126,479 | 11/1978 | Videtto | 501/120 |

*Primary Examiner*—Mark Bell
*Attorney, Agent, or Firm*—Schmidt, Johnson, Hovey & Williams

[57] ABSTRACT

A basic brick composition containing spinel clinker and magnesia clinker wherein pulverized iron oxide by additional weight mixing ratio is mixed or special magnesia clinker is substituted for magnesia clinker instead of addition of iron oxide.

3 Claims, No Drawings

SPINEL-MAGNESIA BASIC BRICK

BACKGROUND OF THE INVENTION

This invention relates to bricks and particularly spinel-magnesia bricks available for use in rotary cement kilns.

What a burning zone is composed of is of great importance for the rotary cement kiln. It has been common up to now that basic bricks such as chrome-magnesia brick, and spinel ($MgO.Al_2O_3$) are used to line such a burning zone. It has been, however, known that a stable coating of cement material should be applied to the work surface of the brick to prolong the life thereof.

It has been found that cement material and basic brick are required to suitably chemically react on each other to have the coating of cement material applied to basic brick, and that a stronger chemical reaction renders brick molten but no chemical reaction or weak chemical reaction involves a poor coating application. An iron modulus, that is, $Al_2O_3/Fe_2O_3$, ingredient of cement material is less than 1.6, preferably, less than 1.5 to have the coating applied to brick. Otherwise, a silica modulus, $SiO_2/(Al_2O_3+Fe_2O_3)$ may be less than 2.5. At any rate, reduction in the iron modulus would be more effective.

The principal ingredients, main minerals of cement material are $2CaO.SiO_2$; $3CaO.SiO_2$ and $4CaO.Al_2O_3.Fe_2O_3$. Among others, $4CaO.Al_2O_3.Fe_2O_3$ is used for application of the coating. The melting points of $2CaO.SiO_2$; and $4CaO.Al_2O_3.Fe_2O_3$ are 2,130° C., and 1,410° C., respectively. $3CaO.SiO_2$ is resolved into CaO and $2CaO.SiO_2$ at a temperature of 1,900° C. The latter provides a conversion from type $\beta$ to type $\gamma$ with increase in volume of about 10% at a temperature of 725° C. in a cooling process so that the coating may readily break and exfoliate. On the other hand, $3CaO.SiO_2$ is resolved into $2CaO.SiO_2$ and CaO at a temperature of about 1,200° C. but fails to obtain complete stability. $4CaO.Al_2O_3.Fe_2O_3$ is contained to a small extent but its penetration to only the surface layer of basic brick not only carry out application of coating in an early stage of the rotary cement kiln but also effectively stabilize coating in operation. Thus, the lower the iron modulus is, the easier coating is applicable. In this connection, it is noted that too much reduction in the iron modulus of cement material should be avoided which might otherwise affect quality of cement.

The use of high purity magnesia clinker in the conventional spinel magnesia brick has been proposed to its texture thereby to minimize impurities such as $Fe_2O_3$ and the like to the utmost extent. As a result, the amount of contained $Fe_2O_3$ in brick is less than 0.1% to obtain brick of very high iron modulus as shown in Table 1. Supposing that 50% each of cement ingredient and brick are mixed with each other in the area of contact between cement material and brick, the iron modulus would be very high leading to difficulty in application of coating.

In the manufacture of the conventional spinel-magnesia brick, material of very high purity has been used due to synthesis of spinel. For instance, high purity seawater magnesia has been used as magnesia material and $Fe_2O_3$ as impurity is maintained below 0.1%. Similarly, a high purity article which contains more than 99% of $Al_2O_3$ has been used as alumina material and $Fe_2O_3$ is also maintained below 0.1%. The conventional spinel-magnesia brick in which these high purity materials are used, entails a high cost of production and provide a poor coating when practised in the rotary cement kiln. This results in something undesirable from the view point of longevity. It has been found in the spinel-magnesia brick that what has caused the poor coating may be the result of formation of $\gamma$-$Al_2O_3$ in the area of spinel and cement clinker.

SUMMARY OF THE INVENTION

It is an object of the present invention to provide a basic brick which comprises more $Fe_2O_3$ while maintaining stability of texture of the conventional spinel-magnesia brick so that the iron modulus of the area of contact between cement material and brick is lowered to the utmost extent to obtain a secure coating bond and to prolong its life.

DETAILED DESCRIPTION OF THE INVENTION

According to the present invention, 0.5–4.5% of iron oxide ($Fe_2O_3$) in the form of powder is added to and mixed in by additional weight mixing ratio in order to lower the iron modulus as much as possible in the conventional spinel-magnesia brick composition consisting of 10–50% of spinel ($MgO.Al_2O_3$) clinker, and 50–90% of magnesia clinker. The reason why the lower limit is fixed at 0.5% is that tests show that less than 0.5% of $Fe_2O_3$ could not lead to a good coating as compared with the conventional spinel-magnesia brick. The upper limit is set at 4.5% because various tests on $Fe_2O_3$, such as repeated heating, cooling, and corrosion tests show a good result below 4.5% whereas above 4.5% a fragile texture and poor corrosion resistance result. This is entirely derived from the fact that $Fe_2O_3$ involves conversion ($FeO \rightleftarrows Fe_2O_3$) accompanied by expansion and contraction when subjected to atmospheric change in oxidation and reduction or thermal change so that its texture is remarkably fragile if the $Fe_2O_3$ content is more than 4.5%.

Special magnesia clinker which contains 3.0–5.0% $Fe_2O_3$ was substituted for a full or partial magnesia clinker as well as iron oxide in the form of powder by additional weight mixing ratio in formula, and a percentage of $Fe_2O_3$ content in brick was 0.5–4.5% to obtain the same excellent effect.

Table 1 shows, for comparison between spinel-magnesia bricks according to the prior art and the present invention, composition, iron modulus, silica modulus, and iron modulus in contact area between cement material and brick.

TABLE 1

|  |  | Common Portland Cement | Conventional Spinel-Magnesia Brick | Instant Basic Brick |
|---|---|---|---|---|
| Principal Chemical Ingredient (%) | $SiO_2$ | 22.0 | 0.3–1.3 | 0.6 |
|  | $Al_2O_3$ | 5.2 | 10–19 | 15.4 |
|  | $Fe_2O_3$ | 3.1 | 0.1> | 1.2 |
|  | CaO | 64.9 | 0.5 | 0.6 |
|  | MgO | 1.5 | 80–90 | 81.5 |
|  | $SO_3$ | 1.5 | — | — |
| Iron Modulus |  | 1.7 | 100< | 12.8 |
| Silica Modulus |  | 2.7 | 0.13> | 0.04 |
| Iron Modulus in Contact Area between Cement Material and Brick |  | — | 5.08< | 7.2 |

Note:
50% cement ingredient and 50% brick are shown as mixed.

As shown in Table 1, the product of the present invention is capable of remarkably lowering the iron modulus in the contact area between cement material and brick as compared with the conventional spinel-magnesia brick.

Table 2 shows analytical data of Example which is used to prepare the instant basic brick.

TABLE 2

| Material | Grading (mm) | A | B | C |
|---|---|---|---|---|
| Special Magnesia Clinker having 4.5% Fe$_2$O$_3$ | 4.0–1.0 | — | 30% | — |
| | 1.0 | — | 30% | — |
| | Fine Powder | — | 30% | 30% |
| High Purity Magnesia Clinker | 4.0–1.0 | 30% | — | 30% |
| | 1.0 | 30% | — | 30% |
| | Fine Powder | 30% | — | — |
| Spinel Clinker | 4.0–1.0 | 10% | 10% | 10% |
| Iron Oxide | | 4% (Add.) | — | — |
| Apparent Porosity (%) | | 15.3 | 16.4 | 16.6 |
| Water Absorption (%) | | 5.1 | 5.6 | 5.6 |
| Apparent Specific Gravity | | 3.55 | 3.56 | 3.55 |
| Bulk Density | | 3.01 | 2.98 | 2.96 |
| Compressive Strength (Kg/cm$^2$) | | 756 | 743 | 572 |
| Spalling 1,200° C. Air Cooling | | No Exfoliation per 10 times | No Exfoliation per 10 times | No Exfoliation per 10 times |
| Chemical Composition | MgO | 88.4% | 83.9% | 89.3% |
| | Al$_2$O$_3$ | 6.9% | 7.2% | 7.2% |
| | Fe$_2$O$_3$ | 3.8% | 4.05% | 1.35% |

Note:
Although spinel-clinker shown in Table 2 consists of 28.3% MgO and 71.7% Al$_2$O$_3$, this does not mean equi-mol blending. In other words excess or deficit MgO over spinel in theoretical value may be used.

The use of the product B of the present invention in the burning zone of NSP (New Suspension Preheater) kiln over a range of 8 m has proved that a stable coating of 200–300 mm was developed upon inspection in downtime after the period of 6 months, and that brick was protected in even running. A portion of the coating was removed by a rock drill to see the state of the brick. This showed that the brick has not been affected at all and retained a residual thickness of 180 mm as compared to the 200 mm thickness of the original brick. On the other hand, the coating of the conventional lined spinel brick and a direct bond chrome magnesia was made thin and measured only 120 mm in residual thickness on the average with respect to the original brick thickness of 200 mm. This was derived from the fact that the coating was not stabilized and exfoliated while the kiln operated. The extent of penetration of cement ingredient to the product of the present invention was 15 mm on the average from a work surface of brick and thus attained the desired object to prove the excellent performance of the instant product.

The brick made according to the present invention fully eliminates problems arising from poor cement coating and overcomes the disadvantage of the conventional spinel-magnesia brick. That is, the technical concept for coating is embodied and applicable to the manufacture of brick.

What is claimed is:

1. A spinel-magnesia basic brick composition consisting essentially of 10–50% spinel (MgO.Al$_2$O$_3$) clinker, 50–90% magnesia clinker, and 0.5–4.5% diiron trioxide, (Fe$_2$O$_3$), said diiron trioxide being present on the basis of the amounts of said spinel and magnesia clinkers totalling 100% by weight.

2. A spinel-magnesia basic brick composition consisting essentially of 10–50% spinel (MgO.Al$_2$O$_3$) clinker and 50–90% magnesia clinker, at least a portion of said magnesia clinker being special magnesia clinker consisting essentially of magnesia clinker and 3.0–5.0% diiron trioxide (Fe$_2$O$_3$), the total content of said diiron trioxide present in said composition being 0.5–4.5%, said diiron trioxide being present on the basis of the amounts of said spinel and magnesia clinkers totalling 100% by weight.

3. The basic brick composition of claim 2, including an additional amount of diiron trioxide added to said composition, apart from the diiron trioxide derived from said special clinker.

* * * * *